United States Patent Office 3,229,249
Patented Jan. 11, 1966

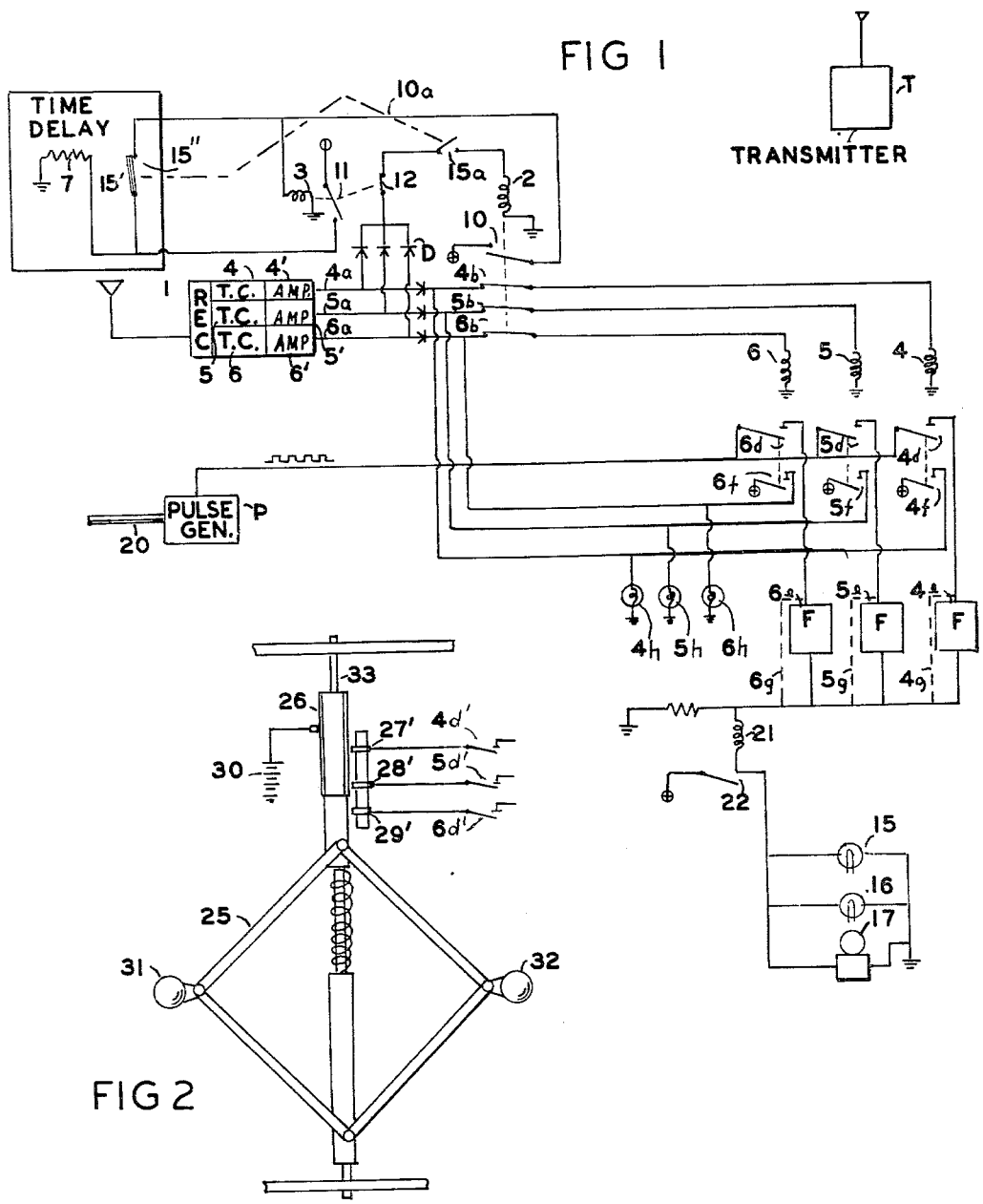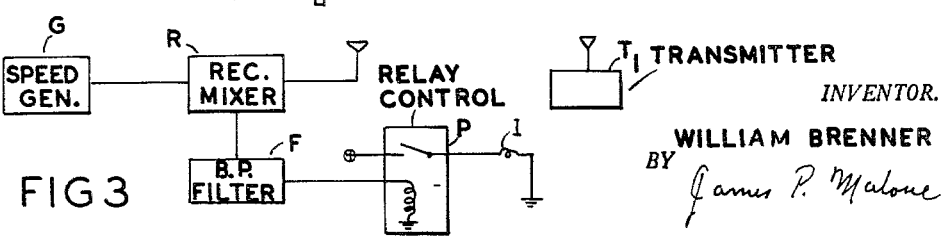

3,229,249
VEHICLE SPEED INDICATOR MEANS
William Brenner, Levittown, N.Y., assignor of fifteen percent to James P. Malone, Mineola, N.Y.
Filed Oct. 12, 1961, Ser. No. 144,688
5 Claims. (Cl. 340—32)

This invention relates to means for indicating the vehicle speed externally of the vehicle.

More particularly the invention relates to means for indicating vehicle speed with a simple easily read indicator which may be read from any direction by observers external to the vehicle for the purpose of facilitating apprehension and conviction of speeders and also to act as a speed deterrent. Radio control means are provided to set the apparatus to local speed limits.

A great number of serious injuries and death result from excessive speed of motor vehicles. The present invention is intended to combat such excessive speed by providing a speed indicator means which may be easily read by observers external to the vehicle.

One embodiment of the invention generally comprises means connected to the vehicle wheels, for instance via the drive shaft or speedometer cable, means to provide a signal proportional to speed, for instance an A.C. or D.C. voltage or pulse generator, indicator lights mounted external to the vehicle, and control means connecting the signal generator means and the indicator. The apparatus is adapted to be set by local roadside radio control for the local speed limit. The speed signal generating means may be a conventional doppler radar, or electromagnetic, sonic, ultrasonic, or equivalent means transmitting and receiving reflections from the ground.

One method of sensing the speed of the vehicle and converting it into electrical information would be a set of points similar to ignition points which would operate to open and close at a rate proportional to the speed of the speedometer cable. A simple cam type of device driven by the speedometer cable would serve this purpose. This would generate a train of pulses, the frequency of which would always be proportional to the speed of the vehicle. The pulses may now be sent to a frequency sensitive means such as a filter box which would in turn serve to energize a relay or plurality of relays if such is required. Thus the relays may be made to respond to different conditions of vehicle speed.

The external indicator may be made to only respond when the vehicle is speeding in the area in which it is by radio, sonic or equivalent means. Thus, if it is moving on a road where the speed limit is 50 m.p.h., the indicator should respond only when the vehicle exceeds 50 m.p.h. When the vehicle is in a 60 m.p.h. speed limit zone the external indicator would respond only when the vehicle speed exceeds 60 m.p.h.

This may be accomplished in the following manner: A radio receiver would be mounted in the vehicle which would be responsive to particular frequencies. A typical vehicle equipped with the proposed device would operate as follows: As the vehicle entered a road having a particular speed limit a local transmitter, radio, sonic, ultrasonic, photoelectric or equivalent, would generate a signal through which the vehicle would have to pass. In passing through the field of the transmitter, the device would respond to the signal sent by the transmitter. The receiver in picking up the signal would set up the indicator and filter system so as to respond to a particular frequency which would correspond to the particular speed limit in that area. For example, suppose we wanted the device to respond at 40 m.p.h., 50 m.p.h. and 60 m.p.h. depending on what the local speed limit happened to be. The device in the vehicle would generate pulses proportional to speed. As an example, let us say 600 c.p.s. at 60 m.p.h., 500 c.p.s. at 50 m.p.h. and 400 c.p.s. at 40 m.p.h. Three filters which would have sharp cutoff up to the indicated frequencies would appear in the device. These filters would feed a relay which would energize the external indicator. The receiver which would be responsive to the signal generated by the local transmitter would operate to connect the proper filter between the pulse generator and the relay which operates the indicator. For example, let us assume that the local transmitters for 60 m.p.h., 50 m.p.h. and 40 m.p.h. had frequencies of 6 megacycles, 5 mc. and 4 mc. respectively. As the vehicle passed through the field of particular transmitter, the receiver would respond to the particular frequency and set up the corresponding filter. With the proper filter selected, the device will now respond only if the speed of the vehicle exceeds the particular speed for which it is set. When the vehicle enters a different speed zone, another signal will be received wherein the previous filter is disconnected and a new proper filter will be selected. If it is desired to have the indicator not operate in a particular area it is a simple matter to provide a signal which will deactivate the indicator. Upon entering a controlled area again the device would automatically set up again when it receives the proper transmitted signal. It follows that this system can be easily extended to provide an indication when a vehicle is traveling below a minimum safe speed. An advantage of this system is that only one light would be required and this would be energized only when the vehicle was speeding over the local speed limit or under a minimum speed limit.

Another important use of the speed indicator system proposed is that there are cases where the speed limit changes during different hours of the day as, for example, school zones. Here is an area where speed limits are critical and the present device can be used to control the speed at the important times, for example, during school hours it would be one speed limit and in nonschool hours or nonschool days the normal speed would prevail.

Another example is speed limits on roads where weather conditions change—where the normal speed limit might be 60 m.p.h. and, under adverse weather conditions, it is desirable to reduce the speed limit to 30 m.p.h., say in fog or icy conditions. Also it could be used to control the lower limit on high speed roads; for example, the car should be alerted to the fact that he is going under 40 or under 30 on a high speed road.

Accordingly, a principal object of the invention is to provide new and improved vehicle speed indicator means mounted externally on a vehicle.

Another object of the invention is to provide new and improved means to facilitate apprehension and conviction of speeders.

Another object of the invention is to provide new and improved speed deterrent means for drivers.

Another object of the invention is to provide new and improved external speed indicating means for vehicles comprising means connected to the vehicle wheels to generate a signal proportional to speed, speed indicator means mounted externally on the vehicle and adapted to be an indication of the vehicle speed in all directions and control means connecting said signal generating means and said external indicating means.

Another object of the invention is to provide new and improved external speed indicating means for vehicles comprising an indicator light visible in all directions, and control means responsive to the speed of the vehicle and to local transmitter means to make the apparatus responsive to a local speed limit.

These and other objects of the invention will be apparent from the following specification and drawings, of which:

FIG. 1 is a schematic diagram of one embodiment of the invention.

FIG. 2 is a schematic diagram of a second embodiment of the invention.

FIG. 3 is a schematic diagram of another embodiment of the invention.

Referring to FIG. 1 there is shown a radio control system which is set by a local roadside transmitter T, to select one of a plurality of filters corresponding to different speeds. Means are provided to reset the control system after the vehicle passes into a new speed zone.

After the vehicle passes into the field of a local transmitter the receiver 1 picks up the transmitted signal and, depending upon the transmitted frequency, the tuned circuits 4, 5, or 6 will pass the signal with suitable amplification by amplifiers 4', 5', or 6', to one of the lines 4a, 5a, or 6a. The tuned circuits 4, 5, and 6 may be set to frequencies corresponding to predetermined speed limits, for instances 40, 50 and 60 miles per hour. Suitable diodes D are inserted in the output lines to prevent undesirable circulating currents.

Assuming a signal corresponding to 40 miles per hour is received, this signal will be picked up by tuned circuit 4 and passed onto the line 4a and will energize the relay 2 through normally closed contact 12 which will cause the contacts 10 to close and the contacts 4b, 5b and 6b to open. The contact 10 completes a circuit through line 10a and relay coil 3. The relay 3 is arranged to close contact 11 before it opens contacts 12. When contacts 12 open, the relay 2 will be deenergized and the contacts 4b, 5b and 6b will be returned to normally closed position. Therefore, a circuit will be completed from the tuned circuit through line 4a, contact 4b to the relay 4c which closes the contacts 4d and 4f. The contacts 4d connect the pulse generator P to the filter 4e. The pulse generator P generates a series of pulses whose frequency corresponds to the vehicle's speed. The pulse generator P may comprise a set of contact points operated by the speedometer cable 20.

The filter 4e is set to pass any pulse frequency above that corresponding to the predetermined speed of 40 m.p.h. Therefore, if the vehicle is exceeding the 40 m.p.h. speed then a signal will be passed to the relay 21 which closes the contacts 22 which then energize the indicators which may comprise an external light 15 mounted on top of the vehicle and an internal light 16 mounted on the dashboard, and if desired an audio alarm 17 also mounted adjacent the driver inside the vehicle.

Coil 4c closes contact 4f for the purpose of holding the circuit through contacts 4d until contact 4b is reset.

Similarly, a 50 mile per hour control circuit may be established through the receiver 1, through tuned circuit 5, line 5a, contacts 5b relay 5c and contacts 5d and 5f to energize the warning means as previously described.

A third circuit may be incorporated, for instance, for 60 m.p.h., comprising receiver 1, tuned circuit 6, line 6a, contacts 6b, relay 6c, and contacts 6d and 6f.

Alternatively, one of the above or an additional circuit may be set for a speed which is too low for safety, for instance, 20 m.p.h., or for any other speeds which it is desired to control. For this arrangement the filter may be a suitable low pass filter.

To return to the reset feature of the control means, when the relay 3 closes, a holding circuit is established from the battery through the contacts 11 and 15". The normally closed contacts 15" are in a time delay device which allows the contacts 15" to stay closed for approximately 15 seconds after being energized. The purpose of this is to keep the control means from recycling until they are out of the field of the local transmitter. The time delay may be provided by heater 7 operating to open the normally closed bimetal contact arm 15'. After the 15 seconds have elapsed and the vehicle is out of the field of the local transmitter which set the speed into the system then the contacts 15" open causing the contacts 11 to open and the contacts 12, to return to its normally closed position, so that the apparatus will be again ready to be reset when it enters a new speed zone having a second local transmitter to set in the new speed. Contacts 15" will close upon cooling of the time delay.

A second set of contacts 15a, may be added to the time delay relay to operate at the same time as 15 and 15'. This set of contacts would be inserted in the line between contacts 12 and relay coil 2 and are shown as 15a. The purpose of this set of contacts is to prevent an oscillating condition from arising if a transmitted signal comes in when the time delay relay opens. These contacts are normally closed and are arranged to open with the other time delay relay contacts 15 and 15', and they are part of the time delay relay.

FIG. 2 shows a modification of the invention which eliminates the pulse generator and filter circuits connected to the output thereof. In this arrangement the speed responsive device may be a conventional governor 25 of the type having weighted balls 31, 32 mounted on a conventional expanding linkage. A slip ring device 26 is mounted on top of the linkage and slides on stationary rod 33, and contracts fixed contacts 27', 28' and 29' at the predetermined speeds of 40, 50 and 60 m.p.h., respectively. Contact 26 is arranged to maintain contact with 27', 28', and 29' for all speeds above the initial contact speed. As the speed changes, the slip ring device will change its position with respect to the fixed contacts so as to complete a circuit from battery 30 through the preselected relay of the group comprising 4d', 5d', and 6d' which would correspond to relays 4d, 5d and 6d, in FIG. 1. In the arrangement of FIG. 2, the filters 4e, 5e and 6e are eliminated as shown by the dotted lines 4g, 5g and 6g.

Where it is desired to have an internal indication of the local speed limit within the vehicle, pilot lights 4h, 5h and 6h can be added to the contacts at 4f, 5f and 6f. These pilot lights will now operate only when the device is set up to its particular speed limit, e.g. one light will be marked 40 m.p.h., one 50 m.p.h. and the other 60 m.p.h., and will give a continuous indication of the area speed limit. This part of the invention could be used without the speed generating means if desired.

FIG. 3 shows an alternate system. A transmitter T1 will beam a frequency corresponding to the speed limit along a controlled highway. Each vehicle will have means such as a generator G in the vehicle to generate a frequency proportional to its speed, for instance, 60 kc. for 60 m.p.h., 70 kc. for 70 m.p.h., etc. The transmitted signal and the signal generated in the vehicle are then mixed in receiver R and the beat or difference frequency is used to actuate the speeding indicator I, via filter F which will pass a band from 900 to 940 kc. For example, to energize relay control P and indicator I.

For example, on a 60 m.p.h. road, the transmitted frequency might be 1000 kc. All vehicles on the road would generate 10 kc. for each 10 m.p.h. or speed.

Therefore, a vehicle at 60 m.p.h. would generate 60 kc. The difference frequency would then be 940 kc. to trigger the speeding signal device. On a 70 m.p.h. road the transmitted signal would be 1010 kc. so that the vehicle would have to travel 70 m.p.h. to generate 70 kc. to give a difference frequency of 940 kc. The signal in all vehicles would be actuated when the difference frequency went down to 940 kc. or smaller. A lower limit is chosen preferably, for example 900 kc., so that the generator signal alone does not trigger the indicator.

I claim:

1. Vehicle illegal speed indicating means adapted to be controlled with a local roadway transmitter transmitting a signal proportional to the local speed limit comprising,
   vehicle mounted means to generate a pulsed signal have frequency corresponding to vehicle speed,
   indicator means mounted externally on said vehicle and adapted to give an external indication of illegal vehicle speed, means to actuate said illegal speed indicating means only during the time of violation comprising means to change said indicator means immediately upon passing into a different speed zone,
control means connecting said signal generator and said indicating means,
said control means comprising a receiver adapted to receive signals from said roadway transmitter,
a plurality of tuned circuits in said receiver responsive to said received signal,
switching means responsive to said tuned circuits to connect said pulse generator to one of a plurality of filters,
said filters being adapted to pass said pulse signal when over a certain frequency, the output of said filters being connected to energize said indicator means.

2. Apparatus as in claim 1 having means to prevent said control means from recycling comprising,
a time delay means connected to said control means to delay said control means until the vehicle is out of the field of the said local roadway transmitter.

3. Apparatus as in claim 1 wherein said filter means is responsive to speed below a predetermined speed.

4. Apparatus as in claim 1 having means to internally indicate illegal speed.

5. Vehicle illegal speed indicating means adapted to be controlled with a roadway transmitter which transmits a signal proportional to the legal speed limit comprising,
vehicle mounted means to generate a pulsed signal having frequency proportional to vehicle speed,
means to actuate said illegal speed indicator only during the time of violation comprising,
vehicle indicator means adapted to give an indication of illegal speed of said vehicle,
means to change said indicator means immediately upon passing into a different speed zone,
control means connecting said signal generator and said indicating means,
said control means comprising a receiver adapted to receive signals from said roadway transmitter,
a plurality of tuned circuits in said receiver,
switching means responsive to said tuned circuits to connect said pulse generator to one of a plurality of filters,
said filters being adapted to pass said pulse signal when over a certain frequency, the output of said filters being connected to energize said indicator means.

References Cited by the Examiner
UNITED STATES PATENTS

| | | | |
|---|---|---|---|
| 2,640,979 | 6/1953 | Carter | 340—264 |
| 2,680,843 | 6/1954 | Ford | 340—264 |
| 2,762,464 | 9/1956 | Wilcox | 340—263 |
| 2,769,949 | 11/1956 | Stratton | 340—263 |
| 2,847,080 | 8/1958 | Zyroykin et al. | 180—82 |
| 3,017,946 | 1/1962 | Davis et al. | 180—82.1 |

NEIL C. READ, *Primary Examiner.*

BENNETT G. MILLER, *Examiner.*